US007984122B2

(12) United States Patent
Titus (10) Patent No.: US 7,984,122 B2
(45) Date of Patent: Jul. 19, 2011

(54) DEDICATED PROCESSOR CORE REQUEST (75) Inventor: Tobin Titus, East Liverpool, OH (US)

(73) Assignee: Microsoft Corporation, Redmond, WA (US)

(*) Notice: Subject to any disclaimer, the term of this patent is extended or adjusted under 35 U.S.C. 154(b) by 226 days.

(21) Appl. No.: 12/477,913

(22) Filed: Jun. 4, 2009

(65) Prior Publication Data
US 2010/0312823 A1   Dec. 9, 2010

(51) Int. Cl.
G06F 15/177 (2006.01)
G06F 15/173 (2006.01)
G06F 15/16 (2006.01)
G06F 9/00 (2006.01)

(52) U.S. Cl. ............. 709/220; 709/203; 709/225; 713/1
(58) Field of Classification Search .......................... None
See application file for complete search history.

(56) References Cited

U.S. PATENT DOCUMENTS

| | | | | |
|---|---|---|---|---|
| 7,464,337 | B2* | 12/2008 | Han et al. | 715/738 |
| 2001/0043237 | A1* | 11/2001 | Schmieder | 345/839 |
| 2004/0148336 | A1* | 7/2004 | Hubbard et al. | 709/202 |
| 2005/0071513 | A1 | 3/2005 | Aguilar et al. | |
| 2005/0081202 | A1 | 4/2005 | Brokenshire et al. | |
| 2007/0255798 | A1* | 11/2007 | Schneider | 709/217 |
| 2008/0133652 | A1* | 6/2008 | Richards | 709/203 |
| 2008/0320293 | A1 | 12/2008 | Rofougaran et al. | |
| 2010/0138830 | A1* | 6/2010 | Astete et al. | 718/1 |

OTHER PUBLICATIONS

Law, et al., "CellFlow: A Parallel Rendering Scheme for Distributed Memory Architectures", Retrieved at <<http://citeseerx.ist.psu.edu/viewdoc/download?doi=10.1.1.50.7805&rep=rep1&type=pdf>>, Proceedings of the International Conference on Parallel and Distributed Processing Techniques and Applications, Nov. 3-4, 1995, pp. 1-21.
Carrol, Jon K., "How to: Building Your Own Render Farm", Retrieved at <<http://www.tomshardware.com/reviews/render-farm-node,2340.html>>, Tom's Hardware Guide, Jul. 17, 2009, pp. 1-5.
Baillot, Yohan, "First Implementation of the Virtual Reality Dynamic Anatomy Tool", Retrieved at <<http://odalab.ucf.edu/Publications/Dissertations/Yohan-thesis.pdf>>, Thesis submitted in School of Computer Sciences, University of Florida, 1998, pp. 1-116.

* cited by examiner

Primary Examiner — Wen-Tai Lin
(74) Attorney, Agent, or Firm — Hope Baldauff Hartman, LLC (57) ABSTRACT Processor core data regarding a client device is received from the client device. A processor core configuration is determined based on the processor core data. The processor core configuration may include instructions for instructing the client device to dedicate a task to a processor core in a plurality of processor cores of the client device. The processor core configuration is transmitted to the client device. A configuration success message is received from the client device. The configuration success message may indicate that the client device successfully implemented the processor core configuration. A virtual world module is then transformed from a first state wherein certain functionality is not provided by the virtual world to a second state wherein the functionality is provided. The virtual world module may be configured to provide the virtual world to the client device.

20 Claims, 4 Drawing Sheets

DEDICATED PROCESSOR CORE REQUEST

BACKGROUND

In recent years, massively multiplayer online ("MMO") computer applications, such as massively multiplayer online role-playing games ("MMORPGs"), have become extremely popular not only with serious gamers, but also with casual gamers and other Internet users. One example of a MMO computer application enables a participant to create and develop a fictional character in a virtual world. The fictional character is usually associated with an avatar or some other visual representation that enables other participants to recognize the particular fictional character. A given participant may develop, among other things, a storyline, a reputation, and attributes of her fictional character by interacting in the virtual world via the fictional character. Other examples of MMO computer applications may not involve the creation of a virtual world representation of the participant.

The virtual world typically includes an environment with a variety of virtual locations containing a variety of virtual objects. In some cases, the virtual locations and the virtual objects mimic realistic locations and objects, while in other cases, the virtual locations and virtual objects are fanciful creations. MMO computer applications generally permit the fictional character to travel across the virtual locations and interact with the virtual objects and other fictional characters.

A virtual world is typically provided across multiple client computers coupled to at least one server computer. The server computer may be configured to manage the virtual world and the interactions with the virtual world made by the client computers. Thus, the performance of the virtual world may be heavily dependent on the performance of the server computer and the communications network between the server computer and the client computers. In this regard, virtual world providers have conventionally allocated significant resources to upgrading server computers and the communications network.

While upgrading the server computers and the communications network may improve the performance of the virtual world, one often overlooked aspect is the performance of the client computers. In some cases, a virtual world provider may provide a short list of system preferences or minimum system requirements that the client computers are supposed to meet prior to accessing the virtual world. For example, the system preferences/requirements may specify a desired or minimum processor speed, memory size, network connection speed, and the like.

If the system preferences/requirements are initially met by a client computer, a virtual world provider should not subsequently impose additional hardware requirements for a client computer to access and utilize the virtual world. A significant drawback with this approach is that the virtual world provider may have no additional control or feedback over the performance requirements for the client computers. Thus, the virtual world provider may be unable to address performance issues (e.g., excessive processor load) that later arise on the client computer and negatively affect the performance of the virtual world. This might occur, for instance, if the virtual world provider releases a more performance demanding version of the virtual world at a time subsequent to when a client computer initially meets the minimum performance requirements.

It is with respect to these and other considerations that the disclosure made herein is presented.

SUMMARY

Technologies are described herein for providing dedicated processor core requests. In an example environment, a server computer may provide access to a MMO environment to multiple client computers over a communications network. In order to manage the performance of the MMO environment, the server computer may request that a client computer dedicate certain tasks to certain processor cores. That is, once the client dedicates a given task to a processor core, only that task and no other tasks are executed by the processor core. A task may refer to a process, a thread, a segment of program code, or the like.

If the client computer accepts the request and indicates that the processor cores have been dedicated as requested, then the server computer may permit access to the MMO environment or a portion of the MMO environment. If the client computer refuses the request, then the server computer may restrict access to the MMO environment or a portion of the MMO environment. For example, in a virtual world, the server computer may permit or restrict access to a virtual world object, event, process, or the like, depending on whether the client computer accepts or refuses the request.

By dedicating certain tasks to certain processor cores, the server computer may ensure that performance issues caused by the client computers do not affect the MMO environment. For example, the server computer may dedicate computationally-intensive tasks (e.g., graphics rendering) to one or more specific processor cores. Dedicating certain tasks to certain processor cores may also provide reliability and security because the dedicated processor cores are prevented from executing other tasks.

According to one embodiment, a method is provided herein for providing dedicated processor core requests. According to the method, processor core data regarding a client device is received from the client device. A processor core configuration is determined based on the processor core data. The processor core configuration may include instructions for instructing the client device to dedicate a task to a processor core in a plurality of processor cores of the client device. The processor core configuration is transmitted to the client device. A configuration success message is received from the client device. The configuration success message may indicate that the client device successfully implemented the processor core configuration. A virtual world module is then transformed from a first state wherein access to a portion of the virtual world is restricted to a second state wherein access to the portion of the virtual world is permitted. The virtual world module may be configured to provide the virtual world to the client device.

It should be appreciated that although the features presented herein are described in the context of a MMO computer application, these features may be utilized with any type of virtual world or environment including, but not limited to, other types of games as well as online social communities. It should also be appreciated that the above-described subject matter may also be implemented as a computer-controlled apparatus, a computer process, a computing system, or as an article of manufacture such as a computer-storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all of the disadvantages noted in any part of this disclosure.

DETAILED DESCRIPTION

The following detailed description is directed to technologies for providing dedicated processor core requests. Through the utilization of the technologies and concepts presented herein, a server computer coupled to multiple client computers may transmit a request to a client computer. In particular, the server computer may request that certain tasks be dedicated to certain processor cores. By dedicating certain tasks to processor cores, those tasks can be assured to have processing power towards executing those tasks. For example, dedicated processing power may be utilized to ensure that computationally-intensive features, such as streaming video, high-level graphics, animation, and high-quality sound. Further, by dedicating certain tasks to certain processor cores, greater security can be provided because the processor cores do not execute tasks other than those dedicated to the processor cores. The request may be transmitted to the client computer after the client computer has attempted to access to a virtual world, a portion of the virtual world (e.g., a virtual world object), or some particular functionality provided by the virtual world. Depending on whether the client computer fulfills the request, the server computer may or may not provide access to the virtual world, the portion of the virtual world, or some particular functionality provided by the virtual world.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

As used herein, the term virtual world refers to a computer-implemented environment, which may include simulated, lifelike environments as well as fanciful, non-existing environments. Examples of virtual worlds may include any massively multiplayer online ("MMO") computer application including, but not limited to, massively multiplayer online role-playing games ("MMORPGs"), virtual social communities, and virtual reality computer applications. In one embodiment, the MMO computer application simulates a real world environment. For example, the virtual world may be defined by a number of rules, such as the presence of gravity or the lack thereof. In other embodiments, the MMO computer application includes a fanciful environment that does not simulate a real world environment.

The virtual world may be inhabited by avatars, which are virtual or symbolic representations of real world participants (hereinafter referred to as participants). As such, each avatar is typically associated with and controlled by a particular participant. Avatars may include two-dimensional and/or three-dimensional images. Through the virtual world, the avatars may interact with other avatars, as well as with virtual objects. Virtual objects may include virtual representations of real world objects, such as houses, cars, billboards, clothes, packages, and soda cans, as well as fanciful creations, such as a teleportation machine or a flying car. The avatars and the virtual objects utilized in the virtual world may or may not be animated images.

Figure 1:
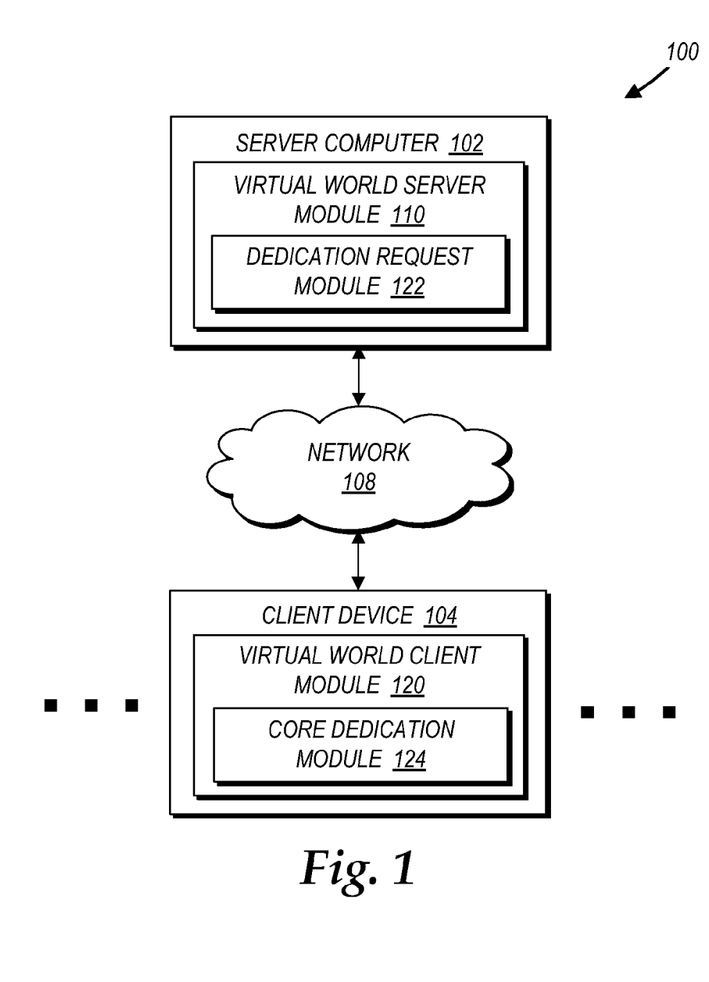
FIG. 1 is a network architecture diagram showing a network architecture capable of implementing a virtual world, such as a massively multiplayer online application, in accordance with embodiments.

In the following detailed description, references are made to the accompanying drawings that form a part hereof, and which are shown by way of illustration specific embodiments or examples. Referring now to the drawings, in which like numerals represent like elements through the several figures, a computing system and methodology for implementing a virtual world will be described. In particular, FIG. 1 illustrates a simplified network architecture 100 for implementing a virtual world. The network architecture 100 shown in FIG. 1 includes a server computer 102 and a client device 104, each of which is coupled via a network 108. The network 108 may be any suitable network, such as a local area network ("LAN") or the Internet. Although only one client device 104 is illustrated in FIG. 1, the network architecture 100 may include multiple client devices and multiple computing devices in any suitable network configuration.

The client device 104 may be any suitable processor-based device, such as a computer or a gaming device. Exemplary gaming devices include the XBOX and the XBOX 360 from MICROSOFT CORPORATION, the WII from NINTENDO COMPANY, LIMITED, and the PLAYSTATION 3 and the PSP from SONY CORPORATION. Although not so illustrated in FIG. 1, the client device 104 may be coupled to any suitable peripheral devices to enable the participant to experience and interact with the virtual world. Example peripheral devices may include an input device, such as a keyboard, a mouse, a microphone, and a game controller, and an output device, such as a display and speakers. Some peripheral devices may even provide both input and output functionality. For example, a game controller may provide vibration feedback.

As shown in FIG. 1, the client device 104 includes a virtual world client module 120, which interacts with a virtual world server module 110 executing on the server computer 102. In particular, the virtual world client module 120 may receive and process data from the virtual world server module 110 and output the data to output devices coupled to the client device 104. Further, the virtual world client module 120 may receive data from input devices coupled to the client device 104 and transmit the data to the virtual world server module 110.

The virtual world client module 120 may include any suitable component for accessing the virtual world server module 110. In one example, the virtual world client module 120 may be a computer application configured to locally provide at least a portion of the virtual world for the client device 104. In this way, the amount of data retrieved from the server computer 102 by the client device 104 to generate the virtual world may be reduced. In another example, the virtual world client module 120 may be a web browser configured to retrieve the virtual world from the virtual world server module 110. Since many public computers, such as those found in Internet cafes, commonly have a web browser installed and prohibit the installation of new computer applications, providing participants a way to access the virtual world via the web browser may provide greater accessibility and convenience. It should be appreciated that a participant may be able to access the virtual world without "entering" the virtual world. For example, the participant may access the virtual world through a third party program (e.g., a social networking service, a blogging service, etc.) that is configured to access data from the virtual world.

As shown in FIG. 1, the server computer 102 includes the virtual world server module 110 and a dedication request module 122. Further, the client device 104 includes a core dedication module 124. The virtual world server module 110 generally administers the virtual world and serves as a conduit between multiple client devices, including the client device 104. The dedication request module 122 generally handles requests to access the virtual world, a portion of the virtual world, or some particular functionality provided by the virtual world. In particular, the dedication request module 122 may grant or deny access to the virtual world or a portion of the virtual world through communications with the core dedication module 124 executing on the client device 104. The core dedication module 124 generally provides processor core data to the dedication request module 122 and implements processor core configurations on the client device 104 at the request of the dedication request module 122.

When a participant desires to access the virtual world, the participant may initiate the virtual world client module 120 to establish a session with the virtual world server module 110 via the network 108. During the session, the virtual world server module 110 may transmit data (e.g., environment layouts, avatar movements of other participants) associated with the virtual world to the virtual world client module 120. Similarly, the virtual world client module 120 may transmit data from associated input devices to the virtual world server module 110.

Figure 2:
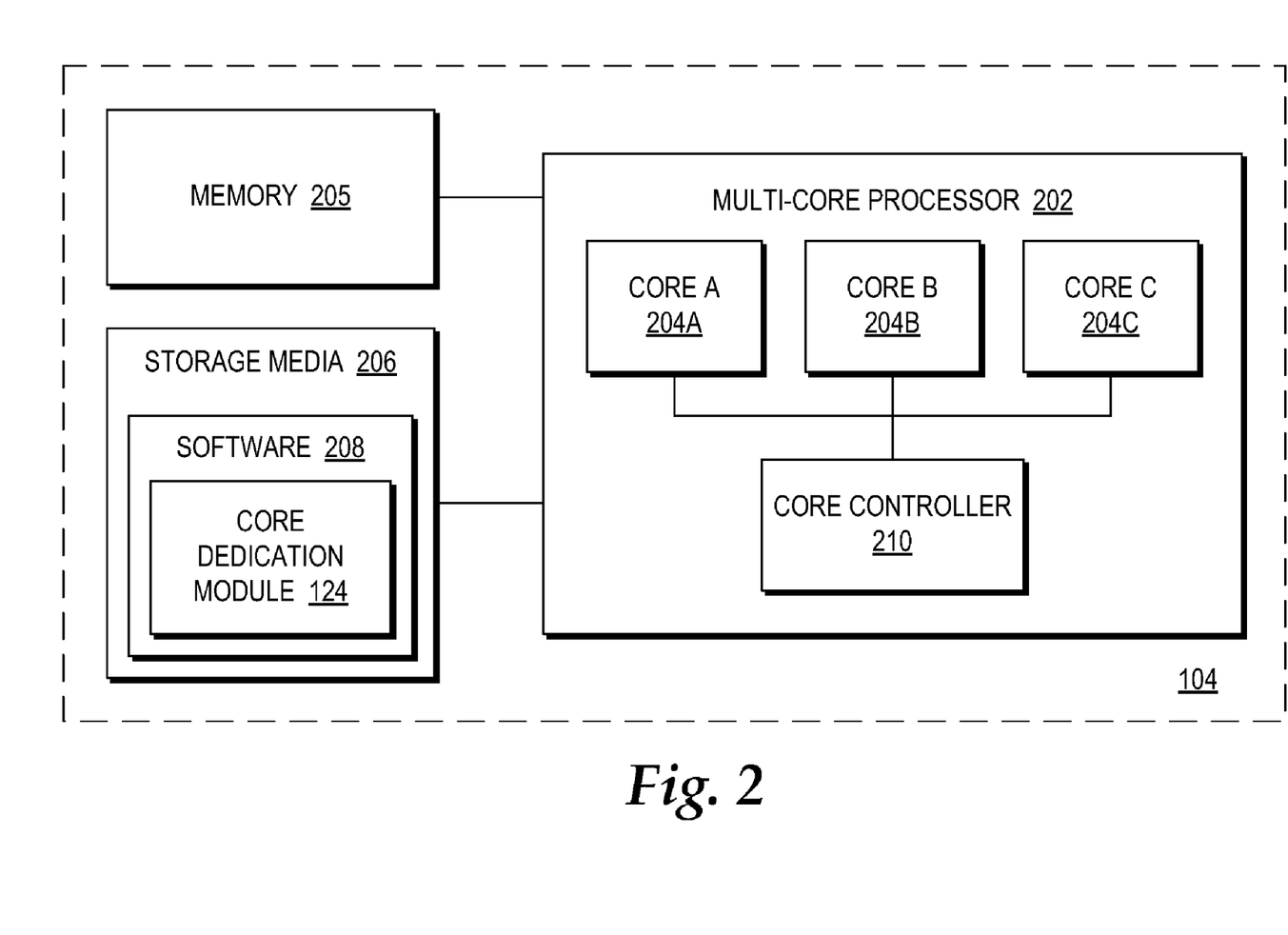
FIG. 2 is a simplified computer architecture diagram showing a multi-core processor capable of implementing a virtual world, in accordance with embodiments.

FIG. 2 is a block diagram illustrating an operating environment for a multi-core processor 202 embodied within the client device 104. Although only a singe multi-core processor 202 is illustrated in FIG. 2, it should be appreciated that the embodiments described herein may be similarly utilized for multiple single core processors operating in a multi-core processor configuration, as well as for multiple multi-core processors.

The multi-core processor 202 includes multiple processor cores 204A-204C (collectively referred to as processor cores 204). Although only three processor cores 204 are illustrated in FIG. 2, other implementations of the multi-core processor 202 may include any number of two or more processor cores. The multiple processor cores 204 may support parallel processing, parallel tasks, parallel threads, separate sequential processes, or any combination thereof. A memory 205 may be accessed by the multi-core processor 202. The multi-core processor 202 may read from and write to the memory 205. Generally, each of the processor cores 204 within the multi-core processor 202 may individually access the memory 205. The memory 205 maybe random access memory random access memory ("RAM"), static RAM ("SRAM"), dynamic RAM ("DRAM"), synchronous DRAM ("SDRAM"), or any other type of volatile or non-volatile memory.

Instructions and data associated with operations on the multiple processor cores 204 of the multi-core processor 202 may be stored on one or more storage media devices, such as a computer-storage media 206. The computer-storage media 206 may be accessed by the multiple processor cores 204 within the multi-core processor 202. The computer-storage media 206 can store software 208 for execution on the multiple processor cores 204 within the multi-core processor 202. By way of example, and not limitation, computer-storage media may include volatile and non-volatile, removable and non-removable media implemented in any method or technology for storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the multi-core processor 202.

The software 208, or other instructions, code, modules, or programs associated with the multi-core processor 202 may include modules, such as the core dedication module 124, configured to respond to dedication requests from the dedication request module 122. As described in greater detail below with respect to FIG. 3, the core dedication module 124 may be configured to dedicate certain tasks to certain cores in accordance to a processor core configuration received from the dedication request module 122. The core dedication module 124 may further be configured to provide feedback to the dedication request module 122 indicating whether the core dedication module 124 has successfully dedicated the tasks to the multiple processor cores 204.

According to some embodiments described herein, a task is dedicated to one or more cores if (1) the task is assigned to be executed by specified cores in the processor cores 204 and (2) other tasks are excluded from being executed by the specified cores. In other embodiments, a task may be considered dedicated to one or more processor cores if the task is assigned to be executed by the specified cores, even if other tasks are not excluded from being executed by the specified cores. For example, core dedication as described herein may be implemented through dynamic masking, whereby a task can be masked or assigned to specified cores.

As illustrated in FIG. 2, the multi-core processor 202 further includes a core controller 210 coupled to the multiple processor cores 204. The core controller 210 may be configured to receive instructions from the core dedication module 124 specifying the tasks that are to be dedicated to each of the processor cores 204. The core controller 210 may also respond to various queries regarding the processor cores 204 from the core dedication module 124. An example query may request the number of available processor cores to be dedicated to certain tasks. The core controller 210 may also "undedicate" the cores 204 when dedication is no longer needed.

In an illustrative example, the core controller 102 may include an execution engine that analyzes a task to be executed. The core controller 102 may analyze the task based on processor core data. An example of processor core data is processor topology information, which may be provided by the multi-core processor 202. For example, some processors manufactured by INTEL CORPORATION may provide such processor topology information (sometimes referred to as "processor topology enumeration"). In particular, these processors may identify the hierarchical relationship of logical processors, processor cores, and/or physical packages in a single-processor or multi-processor system.

The core controller 102 may determine whether the requested task can be performed based on the given system topology information. If the core controller 102 determines that the requested task can be performed based on the given processor topology information, then the core controller 102 may hide and/or show logical processors, processor cores, and/or physical processors when implementing the processor core configuration. In this way, the core controller 102 may facilitate the execution of specific tasks by specific cores.

Figure 3:
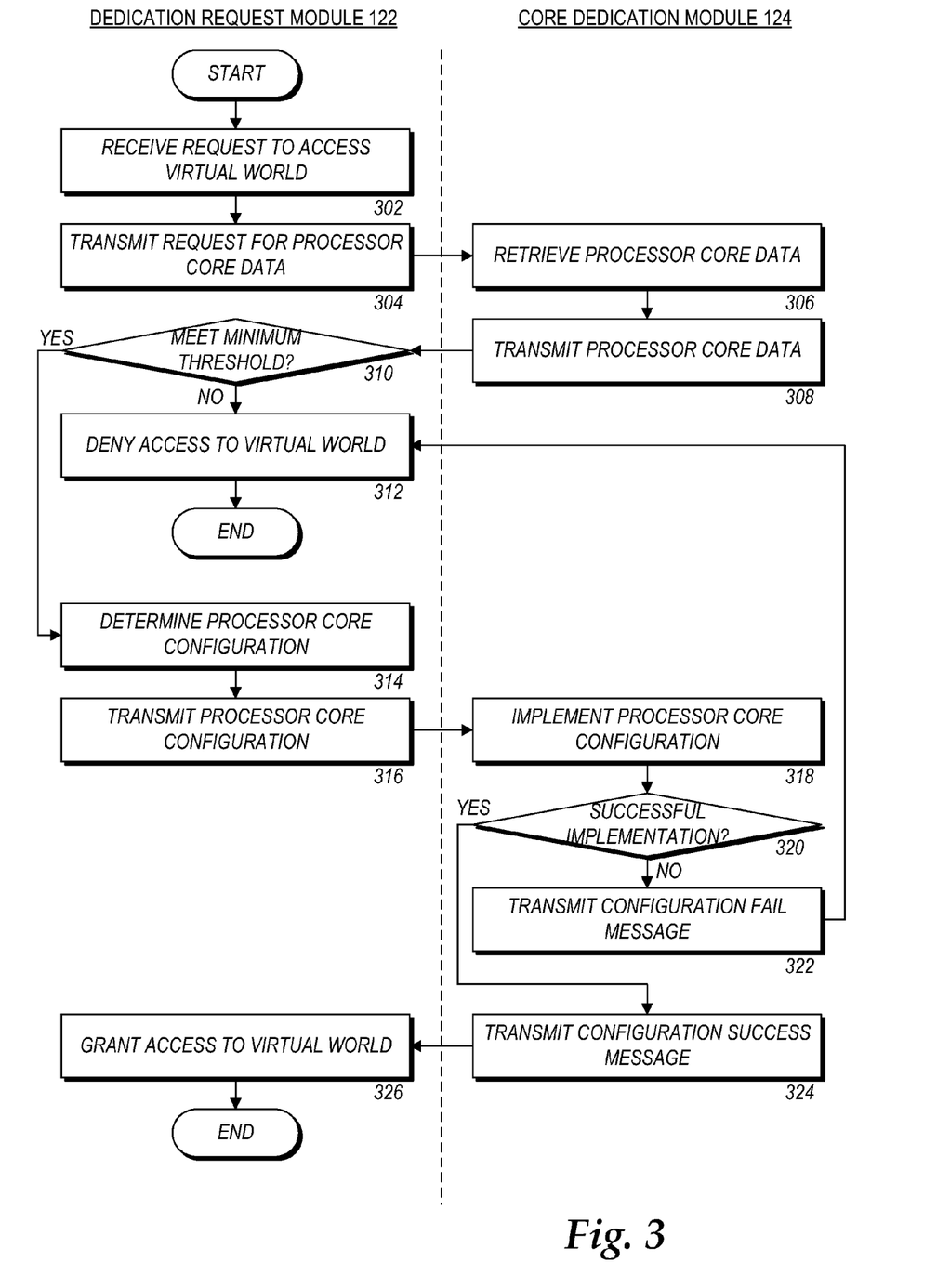
FIG. 3 is a flow diagram illustrating a method for providing dedicated processor core requests to access at least a portion of a virtual world, in accordance with embodiments.

Referring now to FIG. 3, additional details will be provided regarding the embodiments presented herein for providing dedicated processor core requests. In particular, FIG. 3 is a flow diagram illustrating a method for providing and implementing dedicated processor core requests to access at least a portion of a virtual world. The method illustrated in FIG. 3 may be implemented by the dedication request module 122 and the core dedication module 124.

In FIG. 3, a routine 300 begins at operation 302, where the dedication request module 122 in the server computer 102 receives an instruction to dedicate one or more of the processor cores 204 in the client device 104. According to embodiments, the dedication request module 122 may receive the instruction from the virtual world server module 110 and/or the virtual world client module 120 in response to a user attempting to access the virtual world, a portion of the virtual world, or some particular functionality provided by the virtual world (e.g., a virtual world location, a virtual world object, a multimedia file played within the virtual world, etc.). That is, the virtual world, the portion of the virtual world, or some particular functionality provided by the virtual world may be restricted until one or more of the processor cores 204 in the client device 104 are dedicated to perform certain tasks. Once the dedication request dedication request module 122 receives the instruction to dedicate one or more of the processor cores 204 in the client device 104, the routine 300 proceeds to operation 304.

At operation 304, upon receiving the instruction to dedicate one or more of the processor cores 204 in the client device 104, the dedication request module 122 transmits a request to the core dedication module 124 for processor core data. The processor core data may include, for example, the number of available processor cores on the client device 104, the speed of the processor cores, the size of the caches (e.g., L1, L2, etc.) attached to the processor cores, and the like. Once the dedication request module 122 transmits the request to the core dedication module 124 for processor core data, the routine 300 proceeds to operation 306.

At operation 306, in response to receiving the request from the dedication request module 122 for processor core data, the core dedication module 124 retrieves the processor core data from the client device 104. For example, the core dedication module 124 may retrieve the processor core data from an operating system or other application program that contains or is configured to retrieve the processor core data. Once the core dedication module 124 retrieves the processor core data from the client device 104, the routine 300 proceeds to operation 308, where the core dedication module 124 transmits the processor core data to the dedication request module 122 to fulfill the request for the processor core data. The routine 300 then proceeds to operation 310.

At operation 310, the dedication request module 122 determines whether the processor cores identified by the processor core data meet a minimum threshold. For example, the minimum threshold may specify a minimum available number of cores in order for the client device 104 to effectively access the virtual world, portion of the virtual world, or some particular functionality provided by the virtual world. In other examples, the minimum threshold may specify a minimum speed of the available cores or a minimum size of caches attached to the processor cores. If the dedication request module 122 determines that the processor core data does not meet the minimum threshold for accessing the virtual world, then the routine 300 proceeds to operation 312, where the dedication request module 122 denies access to the virtual world, the portion of the virtual world associated with the instruction received in operation 302, some particular functionality provided by the virtual world.

In an embodiment, the dedication request module 122 may maintain a state whereby the virtual world server module 110 and/or the virtual world client module 120 denies access to the virtual world. The routine 300 then terminates. In other embodiments, the dedication request module 122 may also transmit an access denial message to the core dedication module 124. The access denial message may indicate that the client device 104 does not meet minimum hardware requirements for accessing the virtual world, the portion of the virtual world, or some particular functionality provided by the virtual world.

If the dedication request module 122 determines that the processor core data meets the minimum threshold, then the routine 300 proceeds to operation 314 where dedication request module 122 determines a processor core configuration based on the processor core data. For example, the processor core configuration may specify that one of the processor cores be dedicated for a specific task, such as rendering video, while another processor core is dedicated to performing other tasks. In this example, the virtual world provider may dedicate certain processor cores to a computationally intensive task, such as rendering video, in order to ensure that the video can be adequately provided to the client device 104. Once the dedication request module 122 determines the processor core configuration based on the processor core data, the routine 300 proceeds to operation 316.

At operation 316, the dedication request module 122 transmits the processor core configuration to the core dedication module 124. The routine 300 then proceeds to operation 318, where the core dedication module 124 implements or attempts to implement the processor core configuration. For example, the core dedication module 124 may dedicate certain tasks to certain processor cores according to the processor core configuration. Once the core dedication module 124 implements or attempts to implement the core processor core configuration, the routine 300 proceeds to operation 320.

At operation 320, the core dedication module 124 determines whether the processor core configuration has been successfully implemented. If the core dedication module 124 determines that the processor core configuration has not been successfully implemented, then the routine 300 proceeds to operation 322, where the core dedication module 124 transmits a configuration fail message to the dedication request module 122. The routine 300 then proceeds back to operation 312, where the dedication request module 122, in response to receiving the configuration fail message, denies access to the virtual world, the portion of the virtual world associated with the request received at operation 302, or some particular functionality provided by the virtual world. In an embodiment, the dedication request module 122 may maintain a state whereby the virtual world server module 110 and/or the virtual world client module 120 denies access to the virtual world, a portion of the virtual world, or functionality provided by the virtual world.

If the core dedication module 124 determines that the processor core configuration has been successfully implemented, then the routine 300 proceeds to operation 324, where the core dedication module 124 transmits a configuration success message to the dedication request module 122.

The routine 300 then proceeds to operation 326, where the dedication request module 122, upon receiving the configuration success message, grants access to the virtual world, the portion of the virtual world associated with the request received at operation 302, or some particular functionality provided by the virtual world. In an embodiment, the dedication request module 122 transforms from one state whereby the virtual world server module 110 and/or the virtual world client module 120 denies access to the virtual world to another state whereby the virtual world server module 110 and/or the virtual world client module 120 grants access to the virtual. In other embodiments, the dedication request module 122 transmits an access success message to the core dedication module 124. The access success message may indicate that the client device 104 meets minimum hardware requirements for accessing the virtual world, the portion of the virtual world, or some particular functionality provided by the virtual world.

Figure 4:
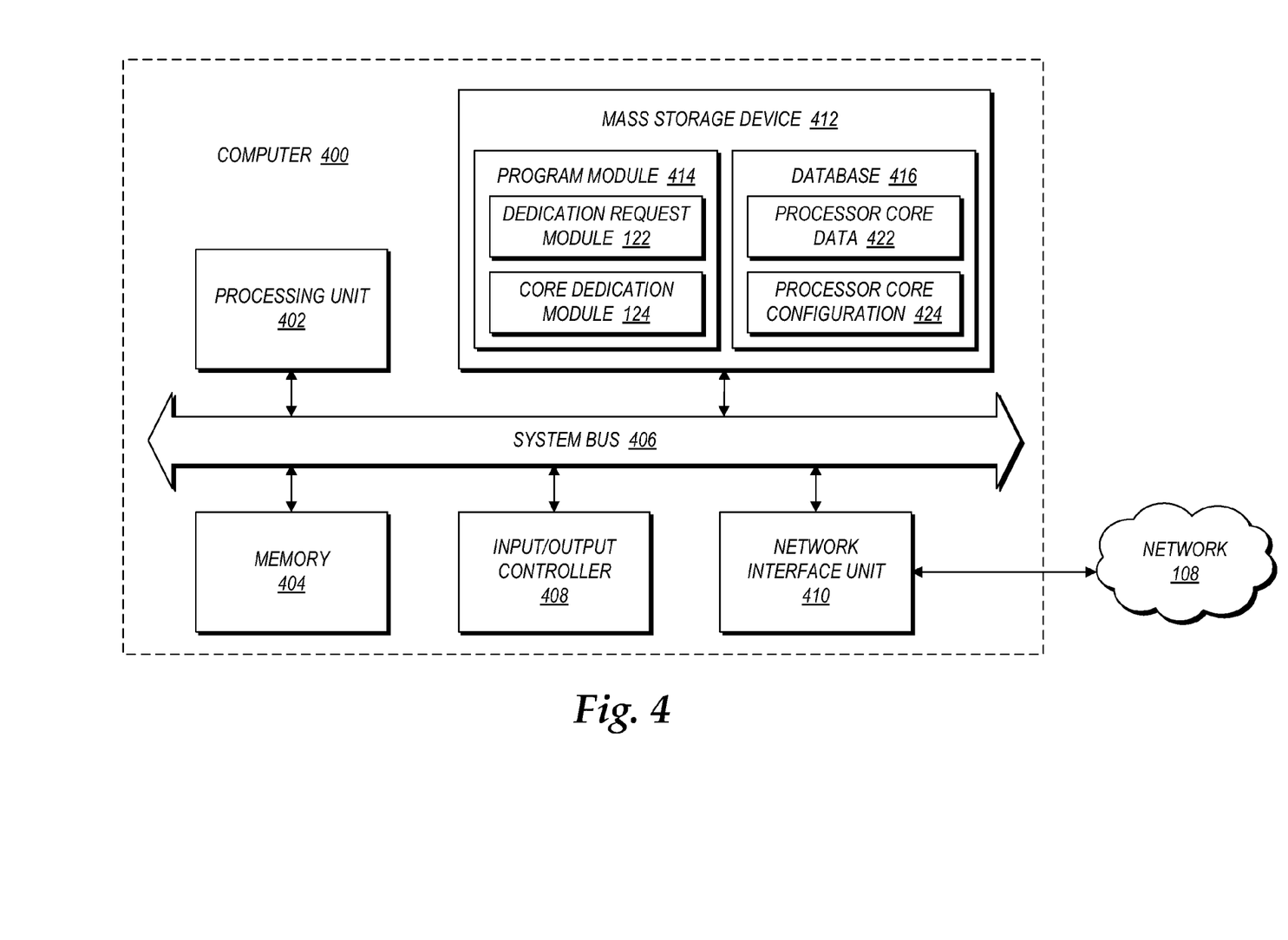
FIG. 4 is a computer architecture diagram showing an illustrative computer hardware architecture for a computing system capable of implementing the embodiments presented herein.

Referring now to FIG. 4, an exemplary computer architecture diagram showing a computer 400 is illustrated. Examples of the computer 400 may include the server computer 102 and the client device 104. The computer 400 includes a processing unit 402 ("CPU"), a system memory 404, and a system bus 406 that couples the memory 404 to the CPU 402. The computer 400 further includes a mass storage device 412 for storing one or more program modules 414 and one or more databases 416. Examples of the program modules 414 include the dedication request module 122 and the core dedication module 124. The databases 416 may store processor core data 422 and a processor core configuration 424, as previously described with respect to FIG. 3. The mass storage device 412 is connected to the CPU 402 through a mass storage controller (not shown) connected to the bus 406. The mass storage device 412 and its associated computer-storage media provide non-volatile storage for the computer 400. Although the description of computer-storage media contained herein refers to a mass storage device, such as a hard disk or CD-ROM drive, it should be appreciated by those skilled in the art that computer-storage media can be any available computer storage media that can be accessed by the computer 400.

According to various embodiments, the computer 400 may operate in a networked environment using logical connections to remote computers through a network such as the network 108. The computer 400 may connect to the network 108 through a network interface unit 410 connected to the bus 406. It should be appreciated that the network interface unit 410 may also be utilized to connect to other types of networks and remote computer systems. The computer 400 may also include an input/output controller 408 for receiving and processing input from a number of input devices (not shown), including a keyboard, a mouse, a microphone, and a game controller. Similarly, the input/output controller 408 may provide output to a display or other type of output device (not shown).

The bus 406 may enable the processing unit 402 to read code and/or data to/from the mass storage device 412 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 414 may include software instructions that, when loaded into the processing unit 402 and executed, cause the computer 400 to provide dedicated processor core requests. The program modules 414 may also provide various tools or techniques by which the computer 400 may participate within the overall systems or operating environments using the components, flows, and data structures discussed throughout this description. For example, the program modules 414 may implement interfaces that provide dedicated core requests.

In general, the program modules 414 may, when loaded into the processors 106 and executed, transform the processing unit 402 and the overall computer 400 from a general-purpose computing system into a special-purpose computing system customized to provide dedicated core requests. The processing unit 402 may be constructed from any number of transistors or other discrete circuit elements, which may individually or collectively assume any number of states. More specifically, the processing unit 402 may operate as a finite-state machine, in response to executable instructions contained within the program modules 414. These computer-executable instructions may transform the processing unit 402 by specifying how the processing unit 402 transitions between states, thereby transforming the transistors or other discrete hardware elements constituting the processing unit 402.

Encoding the program modules 414 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 414 may transform the physical state of the semiconductor memory, when the software is encoded therein. For example, the program modules 414 may transform the state of transistors, capacitors, or other discrete circuit elements constituting the semiconductor memory.

As another example, the computer-storage media may be implemented using magnetic or optical technology. In such implementations, the program modules 414 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for providing dedicated processor core requests to access functionality provided by a virtual world are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing dedicated processor core requests to access functionality provided by a virtual world, the method comprising performing computer-implemented operations for:
   receiving processor core data regarding a client device from the client device;
   determining a processor core configuration based on the processor core data, the processor core configuration comprising instructions for instructing the client device to dedicate a task to a processor core in a plurality of processor cores of the client device;
   transmitting the processor core configuration to the client device;
   receiving a configuration success message from the client device, the configuration success message indicating that the client device successfully implemented the processor core configuration; and
   in response to receiving the configuration success message from the client device, transforming a virtual world module from a first state wherein access to the functionality is restricted to a second state wherein access to the functionality is provided, the virtual world module being configured to provide the virtual world to the client device.

2. The computer-implemented method of claim 1, wherein receiving processor core data regarding a client device from the client device comprises computer-implemented operations for:
   receiving a request to access the functionality provided by the virtual world;
   in response to receiving the receiving the request to access the functionality provided by the virtual world, transmitting a request for the processor core data regarding the client device to the client device; and
   receiving the processor core data regarding the client device from the client device.

3. The computer-implemented method of claim 1, the method comprising computer-implemented operations for:
   receiving a configuration fail message from the client device, the configuration failed message indicating that the client device failed to implement the processor core configuration; and
   in response to receiving the configuration fail message from the client device, maintaining the virtual world module in the first state wherein access to the functionality is restricted.

4. The computer-implemented method of claim 1, wherein determining a processor core configuration based on the processor core data comprises computer-implemented operations for:
   determining whether the processor core data meets a minimum threshold for implementing the processor core configuration;
   in response to determining that the processor core data does not meet the minimum threshold for implementing the processor core configuration, maintaining the virtual world module in the first state wherein access to the functionality is restricted; and
   in response to determining that the processor core data meets the minimum threshold for implementing the processor core configuration, determining the processor core configuration based on the processor core data.

5. The computer-implemented method of claim 1, wherein the processor core data comprises a number of processor cores available to implement the processor core configuration.

6. The computer-implemented method of claim 1, wherein the processor core data comprises a speed of the processor cores or a size of caches attached to the processor cores.

7. The computer-implemented method of claim 1, wherein the client device successfully implements the processor core configuration by ensuring that the task executes on the processor core.

8. The computer-implemented method of claim 7, wherein the client device implements the processor core configuration by dynamically masking the task to be executed on the processor core.

9. The computer-implemented method of claim 1, wherein the client device successfully implements the processor core configuration by (a) ensuring that the task executes on the processor core and (b) preventing other tasks from being executed on the processor core.

10. The computer-implemented method of claim 1, wherein the task comprises a process, a thread, or a segment of program code.

11. A computer system comprising:
    a processor;
    a memory coupled to the processor; and
    a program module (i) which executes in the processor from the memory and (ii) which, when executed by the processor, causes the computer system to provide dedicated processor core requests to access functionality provided by a virtual world by
      receiving a request to access the functionality provided by the virtual world,
      in response to receiving the request to access the functionality provided by the virtual world, transmitting a request for processor core data regarding a client device to the client device,
      receiving the processor core data regarding the client device from the client device,
      determining a processor core configuration based on the processor core data, the processor core configuration comprising instructions for instructing the client device to dedicate a task to a processor core in a plurality of processor cores of the client device,
      transmitting the processor core configuration to the client device,
      receiving a configuration success message from the client device, the configuration success message indicating that the client device successfully implemented the processor core configuration, and
      in response to receiving the configuration success message from the client device, transforming a virtual world module from a first state wherein access to the functionality is restricted to a second state wherein access to the functionality is provided, the virtual world module configured to provide the virtual world to the client device.

12. The computer system of claim 11, wherein the program, when by the processor, further causes the computer system to provide dedicated processor core requests to access functionality provided by the virtual world by receiving a configuration fail message from the client device, the configuration failed message indicating that the client device failed to implement the processor core configuration, and in response to receiving the configuration fail message from the client device, maintaining the virtual world module in the first state wherein access to the functionality is restricted.

13. The computer system of claim 11, wherein determining a processor core configuration based on the processor core data comprises computer-implemented operations for:

determining whether the processor core data meets a minimum threshold for implementing the processor core configuration, in response to determining that the processor core data does not meet the minimum threshold for implementing the processor core configuration, maintaining the virtual world module in the first state wherein access to the functionality is restricted, and in response to determining that the processor core data meets the minimum threshold for implementing the processor core configuration, determining the processor core configuration based on the processor core data.

14. The computer system of claim 11, wherein the functionality provided by the virtual world comprises a virtual world location, a virtual world object, or a multimedia file played in the virtual world.

15. The computer system of claim 11, wherein the processor core data comprises a number of processor cores available to implement the processor core configuration, a speed of the processor cores, or a size of caches attached to the processor cores.

16. The computer system of claim 11, wherein the client device successfully implements the processor core configuration by ensuring that the task executes on the processor core.

17. The computer system of claim 11, wherein the client device implements the processor core configuration by dynamically masking the task to be executed on the processor core.

18. The computer system of claim 11, wherein the client device successfully implements the processor core configuration by (a) ensuring that the task executes on the processor core and (b) preventing other tasks from being executed on the processor core.

19. The computer system of claim 11, wherein the task comprises a process, a thread, or a segment of program code.

20. A computer-storage medium having computer-executable instructions stored thereon which, when executed by a computer, cause the computer to:

receive a request to access functionality provided by a virtual world;

in response to receiving the request to access the functionality provided by the virtual world, transmit a request for processor core data regarding a client device to the client device;

receive the processor core data regarding the client device from the client device;

determine whether the processor core data meets a minimum threshold for implementing the processor core configuration;

in response to determining that the processor core data does not meet the minimum threshold for implementing the processor core configuration, maintain a virtual world module in a first state wherein access to the functionality is restricted, the virtual world module configured to provide the virtual world to the client device;

in response to determining that the processor core data meets the minimum threshold for implementing the processor core configuration, determine the processor core configuration based on the processor core data, the processor core configuration comprising instructions for instructing the client device to dedicate a task to a processor core in a plurality of processor cores of the client device;

transmit the processor core configuration to the client device;

receive a configuration success message from the client device, the configuration success message indicating that the client device successfully implemented the processor core configuration;

in response to receiving the configuration success message from the client device (104), transform the virtual world module from the first state wherein access to the functionality is restricted to a second state wherein access to the functionality is provided;

receive a configuration fail message from the client device, the configuration failed message indicating that the client device failed to implement the processor core configuration; and in response to receiving the configuration fail message from the client device, maintain the virtual world module in the first state wherein access to the functionality is restricted.

* * * * *